United States Patent [19]

Bandlish et al.

[11] Patent Number: 4,870,150

[45] Date of Patent: Sep. 26, 1989

[54] POLYURETHANES MADE FROM BLENDS OF POLYPROPYLENEOXIDE POLYOL AND POLYBUTYLENEOXIDE POLYOL INTERMEDIATES

[75] Inventors: Baldev K. Bandlish, S. Euclid; Larry R. Barron, Mentor, both of Ohio

[73] Assignee: Tremco Incorporated, Cleveland, Ohio

[21] Appl. No.: 197,482

[22] Filed: May 23, 1988

[51] Int. Cl.$^4$ .............................................. C08G 18/28
[52] U.S. Cl. ...................................... 528/45; 528/76; 528/77; 521/914
[58] Field of Search ............................ 528/45, 76, 77; 521/914

[56] References Cited

U.S. PATENT DOCUMENTS

| | | | |
|---|---|---|---|
| 3,169,934 | 2/1965 | Dennett et al. | 260/2.5 |
| 3,634,306 | 1/1972 | Schroeder | 524/476 |
| 4,266,043 | 5/1981 | Fujii et al. | 521/175 |
| 4,301,110 | 11/1981 | Cuscurida et al. | 521/914 |
| 4,433,017 | 2/1984 | Goto et al. | 528/45 |
| 4,581,432 | 4/1986 | Blum et al. | 528/45 |
| 4,624,996 | 11/1986 | Rizk et al. | 525/453 |
| 4,647,646 | 3/1987 | Hardy et al. | 528/45 |
| 4,767,836 | 8/1988 | Cuscurida et al. | 528/45 |

*Primary Examiner*—Maurice J. Welsh
*Assistant Examiner*—L. Henderson
*Attorney, Agent, or Firm*—J. Robert Lindsay; Nestor W. Shust; Daniel J. Hudak

[57] ABSTRACT

A high performance urethane sealant or coating composition is made from a physical blend of a polypropyleneoxide polyol intermediate and a high molecular weight polybutyleneoxide polyol intermediate or copolymers thereof wherein the comonomer is preferably ethyleneoxide. The urethane prepolymer is made by reacting the physical intermediate blend with a polyisocyanate and preferably blocking the same with blocking agents such as phenols to prevent reaction with moisture in the air. Alternatively, the prepolymer can be end capped with an epoxy. Cure is effected through the utilization of curing agents such as polyamines or polyimines, e.g., diamines, amine terminated polyethers, ketimines, aldimines, and the like. The sealant composition can contain various fillers, organosilanes, and the like. The prepolymers as well as the sealants of the present invention have improved physical rubbery type properties such as higher elongation, lower modulus, and generally improved tensile strength. The sealants also have outstanding movement capability properties. Either one-part or two-part systems can be utilized.

20 Claims, No Drawings

POLYURETHANES MADE FROM BLENDS OF POLYPROPYLENEOXIDE POLYOL AND POLYBUTYLENEOXIDE POLYOL INTERMEDIATES

FIELD OF THE INVENTION

The present invention relates to a sealant or coating composition comprising a blocked isocyanateterminated prepolymer, a polyamine or a polyimine curing agent, and optional organosilanes, fillers, and the like. The prepolymer is made from a physical blend of intermediates containing a major amount of a polypropyleneoxide polyol and a minor amount of a polybutyleneoxide polyol, both of which may or may not be copolymers made with ethyleneoxide comonomers.

BACKGROUND

Sealant and coating compositions desirably have a combination of properties which render them particularly suitable for their intended applications. Such compositions should be able to be packaged in sealed containers or cartridges and stored for relatively long periods of time without objectionable "setting up" or hardening, that is curing of the components in the package. The one component sealant composition should form a relatively tack-free surface upon application and upon exposure to atmospheric moisture should cure without the formation of bubbles within a suitable time. The two component system can be formulated into package stable systems with adjustable cure rate and cured sealant properties. When cured, they should adhere tenaciously to a wide variety of surfaces such as glass, aluminum, concrete, marble, and steel. They should also have sufficient elasticity and flexibility to withstand contraction and expansion of panels, and the like, generally associated with temperature variations as a result of climatic changes and/or wind forces.

U.S. Pat. No. 3,634,306 to Schroeder relates to a moisture curing free isocyanate containing polyurethane polymers made from a polyol component containing a branched chain polyoxybutylene polyol in order that a paraffinic or alicyclic hydrocarbon-containing solvent can be employed and still obtain essentially clear solutions. The amount of the polyoxybutylene polyol component utilized is at least 25 mole percent and preferably at least 40 mole percent. The molecular weight of the polyoxybutylene polyol is low, that is, 5,000 or less and preferably 3,000 or less.

SUMMARY OF THE INVENTION

According to the concepts of the present invention, urethane sealants and coatings having high movement capability are produced when a physical blend of polyol intermediates is utilized. The polyol intermediate blend contains a minor amount of a polybutyleneoxide polyol having a molecular weight generally in excess of about 8,000 in association with a major amount of a polypropyleneoxide polyol. The polybutyleneoxide polyol can be a copolymer made from butyleneoxide monomers and an alkylene oxide monomer such as ethylene oxide, propylene oxide, or pentalene oxide. The polypropyleneoxide polyol can also be a copolymer. Reaction of the polyol intermediate blend with a polyisocyanate yields a prepolymer which is subsequently blocked with blocking agents such as a phenol, or end capped with an epoxy. The curing agent can be a polyamine such as a di-or triamine, e.g. an amine terminated polyether, or a fatty acid amine, or polyimines such as ketimines or aldimines. The sealants and coating compositions of the present invention can be either a two-part system or a one-part system which is moisture curable and forms a tack-free surface upon being exposed to the atmosphere for a short period of time. A cured sealant is formed within a matter of hours after application which adheres tenaciously to a wide variety of substrates.

DETAILED DESCRIPTION OF THE INVENTION

The urethane prepolymers of the present invention are generally made from a physical blend of a polypropyleneoxide polyol intermediate and a polybutyleneoxide polyol intermediate. The polypropyleneoxide polyol can be a homo- or a copolymer having a weight average molecular weight of from about 1,000 to about 10,000 and preferably from about 4,000 to about 7,000. The amount of the polypropyleneoxide polyol intermediate is from about 60 to about 95 percent by weight, desirably from about 75 to about 93 percent by weight, and preferably from about 80 to about 90 percent by weight based upon the total weight of the polypropyleneoxide polyol and the polybutyleneoxide polyol. The amount of the comonomer is generally from about 0 to about 60 percent and preferably from about 2 to about 6 percent by weight based upon the total weight of the comonomer and the propyleneoxide monomer. Comonomers include butyleneoxide, pentaleneoxide, with ethyleneoxide being preferred. The copolymers can either be random or blocked. The polyol intermediate may or may not be a blend of monols, diols, or triols. Generally, the average functionality of the polypropyleneoxide polyol intermediate is from about 1.9 to about 3.0.

Considering the polybutyleneoxide polyol intermediate, it can be a homopolymer or a copolymer. Suitable comonomers which can be utilized include ethyleneoxide, propyleneoxide, or pentaleneoxide. Ethyleneoxide is a preferred comonomer. The amount of the comonomer is generally from about 0 percent to about 60 percent by weight, based upon the total weight of the comonomer and the butyleneoxide monomer. The copolymer can be blocked or random. Regardless of whether or not a comonomer is utilized, the molecular weight of the polybutyleneoxide polyol intermediate is generally high, that is it has a weight average molecular weight of from about 8,000 to about 30,000 and preferably from about 12,000 to about 20,000. The amount of the polybutyleneoxide polyol intermediate is from about 5 percent to about 40 percent by weight, desirably from about 7 percent to about 25 percent by weight, and preferably from about 10 percent to about 20 percent by weight based upon the total weight of the polypropyleneoxide polyol intermediate and the polybutyleneoxide polyol intermediate. The average functionality of the polybutyleneoxide polyol intermediate is from about 1.9 to about 3.0.

While the physical polyol intermediate blend of the present invention is generally based upon the two above types of intermediates, it is to be understood that small amounts, that is generally less than 10 percent by weight of one or more additional polyol intermediates, or copolymers thereof, such as polyethyleneoxide polyol, polycaprolactone, various polyester polyols, polytetramethylene glycols, or other polyols known to the art, can be utilized based upon the total weight of the polypropyleneoxide polyol and the polybutyleneoxide polyol intermediates.

The polyisocyanates which are reacted with the physical blend of the polyol intermediates generally have the formula $R(NCO)_n$ wherein n is 2, 3 or 4 and R is an aliphatic, an aromatic, or an aliphatic substituted aromatic having from 4 to 20 carbon atoms and preferably from 6 to 15 carbon atoms. Desirably the aliphatic groups are alkyl groups. Examples of specific di- or triisocyanates which can be utilized include p,p',p"-triisocyanato triphenyl methane, p,p'-diisocyanato diphenyl methane (MDI), hexamethylene diisocyanate, naphthalene-1,5-diisocyanate, and various isomers of toluene diisocyanates (TDI) such as 2,4-tolylene diisocyanate, 2,6-tolylene diisocyanate, and mixtures thereof. MDI and TDI are preferred. Inasmuch as an adhesive type composition is desired, the equivalent weight ratio of the polyisocyanate to the polyol intermediate, that is the NCO/OH ratio is from about 1.8 to about 2.2 and preferably from about 2.0 to about 2.1. The formation of the prepolymer while occurring at ambient temperature is generally conducted at higher temperatures to reduce the reaction time as from between 40° to about 125° C. with from about 60° to about 100° C. being preferred.

In order to provide a prepolymer that is more stable during storage, the isocyanate-terminated prepolymer described above is substantially "blocked" with a blocking agent that reacts with the terminal isocyanate groups of the prepolymer. Blocking agents useful in the present invention include any conventional blocking agents as well as those known to the art and to the literature that produce blocked terminal isocyanates that do not readily react with moisture in air at room temperature (about 25° C.). However, upon exposure of the curing agents to moisture, they will "unblock" the isocyanate and react therewith. General types of blocking agents include the various phenol type compounds, various oxime compounds, various ester compounds, and the like. Examples of suitable blocking agents include phenol, 3-methoxyphenol, 4-methoxyphenol, nonylphenol, meta-cresol, paracresol, 4-chlorophenol, meta-hydroxybenzaldehyde, ortho-hydroxybenzaldehyde, parahydroxybenzaldehyde, hydroquinone, 1-hydroxy-2-propanone, 3-hydroxyacetophenone, 4-hydroxyacetophenone, ethyl acetyl acetate and cyclohexanone oxime. A sufficient amount of the blocking agent is utilized to react with the isocyanate prepolymers to substantially "block" the terminal isocyanate groups and preferably to block all of the terminal isocyanate groups. The amount of blocking agent utilized is such that the equivalent weight ratio of the blocking agent to the terminal isocyanate groups is at least 0.85, generally it is at least 1.00 or at least 1.05 and often is utilized in a large excess since it can be used as a plasticizing agent.

In lieu of blocking agents, the terminal isocyanate groups of the prepolymer can be end capped with an epoxy type compound such as hydroxy aliphatic epoxide compounds, compounds containing an active hydrogen and aliphatic unsaturation capable of undergoing epoxidation in situ, and mixtures thereof, such as glycidol and 2-alkyl glycidols wherein said alkyl group has from 1 to 4 carbon atoms. Examples of such suitable end capping epoxy type compounds are set forth in U.S. Pat. No. 3,445,436 which is hereby fully incorporated by reference. Accordingly, an equivalent weight ratio of the epoxy compound to the terminal NCO groups is from about 0.8 to about 1.1 and preferably from about 0.9 to about 1.0.

The curing agents of the present invention include the various polyamine and the various polyimine compounds. The particular type of curing agent utilized generally depends upon whether a two part urethane sealant or coating system is utilized or a one part system. When a two part system is utilized, the curing agent is contained as a separate component or composition which is not mixed with the prepolymer component or composition until immediately prior to application of the sealant or coating composition. Generally, any conventional polyamine curing agent can be utilized including those known to the art and to the literature. An example of a typical polyamine curing agent is a diamine or a triamine represented by the formula:

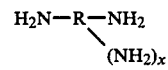

wherein R is an aliphatic, or an aliphatic substituted aromatic, with the aliphatic group being connected to the amine group having from 1 to 25 carbon atoms and preferably from 2 to 10 carbon atoms, with x being 0 or 1, and preferably 0. Examples of specific amine compounds include ethylene diamine, propylene diamine, butylene diamine, octamethylene diamine, decamethylene diamine, and the like.

Another class of suitable polyamine compounds are the various amine terminated polyethers. These compounds are generally diamines or triamines containing polyether groups therein wherein the number of ether repeating units can vary as from about 2 or 3 up to about 150. The molecular weight of the amine terminated polyethers is generally from about 200 to about 7000. Such compounds are produced by the Texaco Chemical Co. under the brand name Jeffamine such as the M series, the D series, the ED series, the DU series, the BuD series, the BuD-2000 series and the Jeffamine T series. Such amine terminated polyethers are described in the bulletin, "The Jeffamine Polyoxyalkyleneamines", by the Texaco Chemical Co., Copyright 1985, NPD-024 102-0745, which is hereby fully incorporated by reference. A particularly preferred compound is the Jeffamine D compounds which have the following formula:

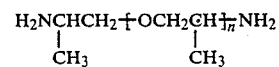

wherein n is from 2 to about 100 and preferably from about 4 to about 20.

Still another class of suitable polyamine compounds are the polyamide polyamines made from polyamines and dicarboxylic acids having from 2 to 36 carbon atoms such as oxalic acid, malonic acid, succinic acid, adipic acid, suberic acid, azelalic acid, dimerized fatty acids, trimerized fatty acids, and the like.

When a one part system is utilized, that is a composition in which all of the components of the polyurethane sealant or coating are contained together, a polyimine curing agent is generally utilized. The polyimines will not react with the blocked isocyanateterminated prepolymer unless exposed to moisture as upon application of the sealant. Various polyimines can be prepared by reacting any of the above polyamine compounds with either a ketone or an aldehyde as well known to those skilled in the art and to the literature. The end result is the production of various ketimine compounds or aldimine compounds. Examples of specific ketimine type compounds which can be utilized are set forth in U.S. Patent No. 4,507,443 which is hereby fully incorporated by reference.

Regardless of whether a one part or two part system is utilized, the amount of the polyamine or polyimine curing agent is from about 0.6 to about 1.5 weight equivalents and preferably 0.8 to 1.2 weight equivalents per equivalent of a blocked isocyanate. In case of an epoxy end capped polyisocyanate based sealant, the amount of polyamines or polyimine curing agent is from about 0.4 to about 1.2 weight equivalents and preferably from about 0.5 to about 0.9 weight equivalents per equivalent of epoxy encapped isocyanate.

When a two component system is utilized, as noted above, one of the components contains the prepolymer and the second component contains the curing agent. The curing agent component generally contains the polyamine curing agent, and various additives in conventional amounts, if desired, such as various plasticizers, pigments, thickeners, drying agents, and the like. The prepolymer or base component contains various conventional additives or compounding ingredients such as fillers, thixotropic agents, extenders, pigments, plasticizers, UV absorbers, solvents, and the like. Typically, the prepolymer component contains large amounts of a filler such as talc, various types of silicates, various types of clays, calcium carbonate, and the like, in an amount of from about 60 to about 200 parts by weight per 100 parts by weight of the prepolymer; a thickening agent such as a thixotropic compound in an amount of from 0 to about 30 parts by weight per 100 parts by weight of the prepolymer; UV absorbers in an amount of usually less than 1 or 2 parts by weight per 100 parts by weight of the prepolymer; and plasticizers in an amount of from about 0 to about 50 parts by weight per 100 parts by weight of the prepolymer. Solvents, which are generally utilized to adjust the viscosity of the prepolymer or base component to a desired range, constitute generally less than 10 percent volatility of the total prepolymer component for sealant compositions. In coating compositions, the amount of solvent is generally higher.

An optical aspect of the present invention is the utilization of an organosilane or an organosiloxane as an adhesion promoter. The amount of such adhesion promoter is from about 0.1 to about 10 parts by weight per 100 parts by weight of the prepolymer. Types of various adhesion promoters which are desired include an epoxysilane, an isocyanato silane, a ketimino silane, an aminosilane, the reaction product of a mercaptosilane with a monoepoxide, the reaction product of an epoxysilane with a secondary amine or the reaction product of an aminosilane with an acrylic monomer. Suitable aminosilanes for use in the present invention include aminoalkylalkoxysilanes such as gamma-aminopropyltriethoxysilane, gamma-aminopropyltrimethoxysilane, gamma-aminopropylmethyldiethoxysilane and gamma-aminopropylmethyldimethoxysilane, and the reaction products of aminoalkylalkoxysilanes (such as gamma-aminopropyltrimethoxysilane and gamma-aminopropyltriethoxysilane) with ethyl acrylate, butyl acrylate, 2-ethylhexyl acrylate, cellosolve acrylate, methylmethacrylate, butyl methacrylate, 2-cyanoethyl acrylate, glycidyl acrylate and acrylonitrile. The reaction product of a mercaptosilane with a monoepoxide include, for example, the reaction products of gamma-mercaptopropyltrimethoxysilane or gamma-mercaptopropyltriethoxysilane with butylene oxide or styrene oxide, can also be utilized. An example of a reaction product of an epoxysilane (such as an epoxyalkylalkoxysilane with a secondary amine) is the reaction product of gamma-glycidoxypropyltrimethoxysilane, with di-n-butyl amine. Also useful as adhesion promoters are the siloxane derivatives of the above silane compounds.

The prepolymers of the present invention utilizing the above-noted physical blend of a polypropyleneoxide polyol intermediate and a polybutyleneoxide polyol intermediate can be formulated into sealants or coatings with improved properties such as improved elongation, reduced modulus, generally increased tensile strength, and the like. A notable improved property is movement capability as measured according to ASTM C920-86. According to the concepts of the present invention, movement capability as measured by the above tests includes up to 50 percent compression and up to 100 percent extension without damage to the sealant. Heretofore, conventional urethane sealants would typically only pass a 25 percent compression movement and up to a 25 percent extension movement.

The invention will be better understood by reference to the following examples.

EXAMPLE 1

A blocked isocyanate-terminated polymer was formed according to the following procedure.

About 3000 parts by weight of a polyol consisting of a copolymer of propyleneoxide with ethyleneoxide having an average equivalent weight of about 2,110 was admixed with 467 parts by weight of toluene and azeotroped to remove 317 parts by weight of toluene. After cooling under nitrogen atmosphere, 259.8 parts by weight of an 80/20 weight percent mixture of 2,4-tolylene diisocyanate and 2,6-tolylene diisocyanates were added at room temperature. The resulting mixture was heated to 90° C. and held at that temperature for 3.0 hours, to form the isocyanate-terminated prepolymer. Then 344 parts by weight of nonylphenol were added to the mixture and the mixture was maintained at 90° C. for one hour. Next, 0.24 parts by weight of stannous octoate (a catalyst for promoting blocking of the isocyanate-terminated polymer) were added to the mixture and the mixture was maintained at 90° C. for an additional two hours. The resulting reaction product was a blocked isocyanate-terminated polymer. Statistically, 100 grams of this polymer contained 41.6 milliequivalents of the reactive sites.

EXAMPLE 2

A blocked isocyanate-terminated polymer was made from a mixture of polybutyleneoxidepolyol and ethyleneoxide capped polypropyleneoxide triol.

About 200 parts by weight of a polybutyleneoxide triol having an average molecular weight of about 12,500 was admixed with 800 parts by weight of a polyol consisting of a copolymer of propyleneoxide with ethyleneoxide having an average equivalent weight of about 2,100 and 300 parts by weight of toluene. This reaction mixture was azeotroped to remove 200 parts by weight of toluene. After cooling under nitrogen atmosphere, 80.2 parts by weight of a 80/20 weight percent mixture of 2.4-tolylene diisocyanate and 2,6-tolylene diisocyanate were added at room temperature. The resulting mixture was heated to 90°–95° C. and held at that temperature for three hours to form the isocyanate-terminated prepolymer. About 101.4 parts by weight of nonylphenol then were added to the mixture and the mixture was maintained at 90°–95° C. for one hour. Lastly, 0.1 parts by weight of stannous octoate were added to the mixture and the mixture was maintained at 90°–95° C. for an additional two hours. The resulting reaction product was a blocked isocyanate-terminated prepolymer blend. Statistically, 100 grams of the above polymer contained 34.25 milliequivalents of the reactive sites.

EXAMPLE 3

About 500 parts by weight of a polybutyleneoxide triol having an average molecular weight of 12,500 was admixed with 200 parts by weight of toluene. This reaction mixture was azeotroped to remove 140 parts by weight of toluene. After cooling under nitrogen atmosphere, 21.5 parts by weight of a 80/20 weight percent mixture of 2,4-tolylene diisocyanate and 2,6-tolylene diisocyanate were added at room temperature. The resulting mixture was stirred at room temperature for 30 minutes and then heated at 90° C. for 4 hours. Next, 26.0 parts by weight of nonyphenol were then added to the reaction mixture and the mixture was heated at 92° C. for an hour. Lastly, 0.06 parts by weight of stannous octoate were added to the mixture and the mixture was maintained at 90°–95° C. for an additional two hours. The resulting reaction product was a blocked isocyanateterminated polybutyleneoxide triol based prepolymer. This prepolymer was cured with 75 percent stoichiometric amount of Jeffamine D-400 and the mechanical properties of the cured prepolymer are given in Table I. These results are used as a control for Example 4.

EXAMPLE 4

The prepolymer prepared according to the procedure given in Example 2 is cured with a 74.5 percent stoichiometric amount of Jeffamine D-400 and the mechanical properties of the cured prepolymer are given in Table I. Data in Table I clearly shows that mechanical properties of this prepolymer prepared from a blend of polybutyleneoxide triol and ethyleneoxide capped polypropyleneoxide polyol are superior to the similarly cured 100 percent polybutyleneoxide triol based prepolymer.

EXAMPLE 5

Prepolymer preparation is described in Example 1. This prepolymer was formulated as shown in Table II.

A 95 percent stoichiometric amount of the ketimine is used in this formulation. Cure properties are given in Table III. This data is used as the control for Example 6.

EXAMPLE 6

About 103.0 parts by weight of a 1:1 copolymer of 1,2-butyleneoxide and ethyleneoxide having a hydroxyl number of 8.4 was admixed with 400 parts by weight of a copolymer of ethyleneoxide (5 percent) with propyleneoxide (95 percent) having an average equivalent weight of 2100. About 199 parts of toluene was azeotroped to remove 149 parts by weight of toluene. After cooling 38.5 parts by weight of a 80/20 weight percent mixture of 2,4-tolylene diisocyanate and 2,6-tolylenediisocyanate were added at room temperature. The resulting mixture was heated to 90-95° C. and held at that temperature for three hours to form the isocyanate terminated prepolymer. Next, 51.8 parts by weight of nonylphenol were then added to the reaction mixture which was then maintained at 85°–95° C. for one hour. Next, 0.03 parts by weight of stannous octoate were added to the mixture and the mixture was maintained at 90°–95° C. for an additional two hours. The resulting reaction product was a blocked isocyanate terminated prepolymer blend. This prepolymer was formulated according to the recipe given in Table II. The curative used in this recipe was 96 percent of the stoichiometric amount. Data in Table III clearly shows that this sample exhibited improved elongation, modulus, adhesion and passed +50/−50 movement capability.

EXAMPLE 7

About 102.7 parts by weight of a 1:1 copolymer of 1,2-butyleneoxide and ethyleneoxide having a hydroxyl number of 8.4 was admixed with 923 parts by weight of an ethyleneoxide (about 5 percent) capped polypropyleneoxide polyol (95 percent) having an hydroxyl number of 26.7. Next, 300 parts of toluene was azeotroped to remove 200 parts by weight of toluene. After cooling, 82.76 parts by weight of a 80/20 weight percent mixture of 2,4-tolylene diisocyanate and 2,6-tolylene diisocyanate were added at room temperature. The resulting mixture was heated to 90°–95° C. for one hour. Next, 0.1 parts by weight of stannous octoate were added to the mixture and it was maintained at 90°–95° C. for an additional two hours. The resulting reaction product was a blocked isocyanate terminated prepolymer. A sealant from this prepolymer was prepared according to the recipe given in Table II. This sealant exhibited +100, −50 percent movement capability (tested according to ASTM C920-86). Polyurethane sealants historically are known to be limited to +/−25 percent or less movement capability.

TABLE I

| | % Jeffamine D-400 Curative | Elongation | Tensile Strength | Modulus | Tear Strength | Adhesion |
|---|---|---|---|---|---|---|
| Example 1 (Control) | | | | | | |
| Polyurethane polymer based on 100% Polypropyleneoxide polyol containing about 5% by weight of ethyleneoxide comonomer | 88% of stoichiometric 1 day at Room Temperature 1 day at 158° F. | 1250 1450 | 164 209 | 40 40 | 0 — | N/A N/A |
| Example 2 (Note 1) | | | | | | |
| Polyurethane polymer based on 20% by weight of Poly-butyleneoxide Polyol (molecular weight | 88.5% of stoichiometric 1 day at Room Temperature | 1650 | 412 | 33 | 41.5 | N/A |

TABLE I-continued

| | % Jeffamine D-400 Curative | Elongation | Tensile Strength | Modulus | Tear Strength | Adhesion |
|---|---|---|---|---|---|---|
| 12,500) 80% Polyethylene-propyleneoxide Polyol (molecular weight 6,000) Example 3 (Control) | 1 day at 158° F. | >1750 | 342 | 32 | 41.3 | N/A |
| Polyurethane polymer based on 100% Polybutyleneoxide polyol (molecular weight 12,500) | 75% of stoichiometric 1 day at Room Temperature | 410 | 68 | 31 | 36 | N/A |
| | 1 day at 158° C. | 325 | 68 | 34 | 30 | N/A |
| Example 4 (Same polymer as Example 2) | | | | | | |
| Polyurethane polymer based on 20% by weight of Poly-butyleneoxide Polyol (molecular weight 12,500) 80% Polyethylene-propyleneoxide Polyol (molecular weight 6,000) | 74.5% of stoichiometric 1 day at Room Temperature 1 day at 158° C. | >1800  >1800 | 88  87 | 22  22 | 27  27 | N/A  N/A |

Note 1 - Example 2 containing a blend of polybutyleneoxide polyol and a polyethyleneoxide and propyleneoxide based polyol clearly shows a significant improvement in properties such as elongation, modulus and tensile strength as compared to the control in Example 1.

TABLE II

| Material | Example 5 (parts by weight) | Example 6 (parts by weight) | Example 7 (parts by weight) |
|---|---|---|---|
| Polymer | 100 | 100 | 100 |
| Thixcin R | 15 | 15 | 15 |
| Benzoflex 9-88 | 26 | 26 | 26 |
| Calcium Carbonate | 60 | 60 | 60 |
| Paraffin Wax | 2.2 | 2.2 | 2.2 |
| Process Oil | 4.4 | 4.4 | 4.4 |
| Methyltrimethoxysilane | 1.2 | 1.2 | 1.2 |
| Gamma-glycidoxy-propyltrimethoxysilane | 0.5 | 0.5 | 0.4 |
| Ketimine | 11.5 | 10.2 | 9.0 |

The above ingredients were mixed thoroughly in sequence starting with the polymer.

TABLE III

| | Example 5 | Example 6 |
|---|---|---|
| Elongation, % | 825 | 1263 |
| 100% Modulus, psi | 74 | 71 |
| Tensile strength, psi | 198 | 326 |
| Adhesion on concrete after water immersion | 100% Adhesive 15.4 pounds | 100% Cohesive 23.3 pounds |
| Movement Capability | +50/−50 Failed | +50/−50 Passed |

While in accordance with the Patent Statutes, the best mode and preferred embodiment have been set forth, the scope of the invention is not limited thereto, but rather by the scope of the attached claims.

What is claimed is:

1. A polyurethane sealant composition, comprising:
   an isocyanate-terminated prepolymer having substantially all of said isocyanate-terminated end groups blocked with a blocking agent, and
   an effective amount of a polyimine curing agent or a separate polyamine curing agent capable of curing said blocked urethane prepolymer,
   said urethane prepolymer made from a blend of polyol intermediates, said polyol intermediate blend containing from about 60 percent to about 95 percent by weight of a polypropyleneoxide polyol, and from 5 percent to about 40 percent by weight of a polybutyleneoxide polyol, said percentages based upon the total weight of said polypropyleneoxide polyol and said polybutyleneoxide polyol.

2. A polyurethane sealant composition according to claim 1, wherein said polybutyleneoxide polyol intermediate is a homopolymer or a copolymer, wherein said copolymer is made from butyleneoxide monomers and from about 0 percent to about 60 percent by weight of an alkyleneoxide comonomer of ethyleneoxide, propyleneoxide, or pentaleneoxide, said percentage amount of said comonomer based upon the total weight of said butyleneoxide monomer and said alkyleneoxide monomer; wherein said polypropyleneoxide polyol intermediate is a homopolymer or a copolymer, wherein said copolymer is made from propyleneoxide monomers and from about 0 percent to about 60 percent by weight of an ethyleneoxide comonomer, a butyleneoxide comonomer or a pentaleneoxide comonomer, said percentage of said comonomer based upon the total weight of said propyleneoxide monomer and said comonomer; wherein a polyisocyanate is reacted with said blend of said polyol intermediates to form said prepolymer, wherein said polyisocyanate has the formula $R(NCO)_n$ wherein n is 2, 3, or 4, and wherein R is an aliphatic, an aromatic, or an aliphatic substituted aromatic having from 4 to 20 carbon atoms.

3. A polyurethane sealant composition according to claim 2, wherein the molecular weight of said polypropyleneoxide polyol intermediate is from about 1,000 to about 10,000, wherein the amount of said polypropyleneoxide polyol intermediate is from about 75 percent to about 93 percent by weight, wherein the molecular weight of said polybutyleneoxide homopolymer or copolymer is from about 8,000 to about 30,000, and wherein the amount of said polybutyleneoxide polyol intermediate is from about 7 percent to about 25 percent by weight, said percentages based upon the total weight of said polypropyleneoxide polyol and said polybutyleneoxide polyol.

4. A polyurethane sealant composition according to claim 3, wherein said polypropyleneoxide polyol intermediate has an average functionality of from about 1.9 to about 3.0, wherein said polybutyleneoxide polyol intermediate has an average functionality of from about 1.9 to about 3.0, wherein R of said polyisocyanate is an alkyl, an aromatic, or an alkyl substituted aromatic having from 6 to 15 carbon atoms, and wherein the equivalent weight ratio of said polyisocyanate to said blend of said polyol intermediates is from about 1.8 to about 2.2.

5. A polyurethane sealant composition according to claim 4, wherein said polybutyleneoxide polyol comonomer is ethyleneoxide, wherein said polypropyleneoxide polyol comonomer is ethyleneoxide, wherein the amount of said ethyleneoxide comonomer forming said polypropyleneoxide polyol copolymer is from about 2 to about 8 percent by weight based upon the total weight of said ethyleneoxide comonomer and said propyleneoxide monomer, wherein the equivalent weight ratio of said blocking agent to said isocyanate terminated end groups is at least 0.85, and wherein said n of said polyisocyanate is 2.

6. A polyurethane sealant composition according to claim 5, wherein the molecular weight of said polypropyleneoxide polyol is from about 4,000 to about 7,000, wherein the molecular weight of said polybutyleneoxide polyol copolymer is from about 12,000 to about 20,000, wherein the amount of said polypropyleneoxide polyol is from about 80 percent by weight to about 90 percent by weight, wherein the amount of said polybutyleneoxide copolymer polyol is from about 10 percent to about 20 percent by weight, said weight percents based upon the total amount by weight of said polypropyleneoxide polyol and said polybutyleneoxide copolymer polyol, and wherein said polyisocyanate is MDI, TDI, or combinations thereof.

7. A polyurethane sealant composition according to claim 1, wherein said sealant composition is cured, wherein said curing agent is said polyimine or said separate polyamine curing agent, wherein said polyamine is (1) an amine having the formula

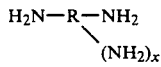

wherein R is an aliphatic or an aliphatic substituted aromatic having from 1 to 25 carbon atoms with the proviso that said aliphatic group is connected to said amine group, wherein x is 0 or 1, (2) an amine terminated polyether, or (3) a polyamide polyamine made from a polyamine and a dicarboxylic acid having from 2 to 36 carbon atoms, a dimerized fatty acid, or a trimerized fatty acid, and wherein said polyimine is a compound produced by the reaction of an aldehyde or a ketone with said (1) amine compound, said (2) amine terminated polyether, or said (3) polyamide polyamine of said dicarboxylic acid, said dimerized fatty acid or said trimerized fatty acid.

8. A polyurethane sealant composition according to claim 4, wherein said sealant composition is cured, wherein said separate polyamine curing agent is (1) an amine having the formula

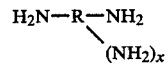

wherein R is an aliphatic or an aliphatic substituted aromatic having from 1 to 25 carbon atoms with the proviso that said aliphatic group is connected to said amine group, wherein x is 0 or 1, (2) an amine terminated polyether, having a molecular weight of from about 200 to about 7,000, or (3) a polyamide polyamine made from a polyamine and a dicarboxylic acid having from 2 to 36 carbon atoms, a dimerized fatty acid, or a trimerized fatty acid, and wherein said polyimine is a compound produced by the reaction of an aldehyde or a ketone with said (1) amine compound, said (2) amine terminated polyether, or said (3) polyamide polyamine of said dicarboxylic acid, said dimerized fatty acid or said trimerized fatty acid.

9. A polyurethane sealant composition according to claim 2, wherein said sealant composition is cured, wherein said curing agent is an amine terminated polyether having the formula

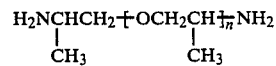

wherein n is from 4 to 20.

10. A polyurethane sealant composition or admixture according to claim 6, wherein said sealant composition is cured, wherein said curing agent is an amine terminated polyether having the formula

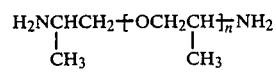

wherein n is from 4 to 20.

11. A polyurethane sealant composition, comprising:
an isocyanate-terminated prepolymer having substantially all of said isocyanate-terminated end groups end capped with an end capping agent, and
an effective amount of a polyimine curing agent or a separate polyamine curing agent capable of curing said blocked urethane prepolymer,
said urethane prepolymer made from a blend of polyol intermediates, said polyol intermediate blend containing from about 60 percent to about 95 percent by weight of a polypropyleneoxide polyol, and from 5 percent to about 40 percent by weight of a polybutyleneoxide polyol, said percentages based upon the total weight of said polypropyleneoxide polyol and said polybutyleneoxide polyol.

12. A polyurethane sealant composition according to claim 11, wherein said polybutyleneoxide polyol intermediate is a homopolymer or a copolymer, wherein said copolymer is made from butyleneoxide monomers and from about 0 percent to about 60 percent by weight of an alkyleneoxide comonomer of ethyleneoxide, propyleneoxide, or pentaleneoxide, said percentage amount of said comonomer based upon the total weight of said butyleneoxide monomer and said alkyleneoxide monomer; wherein said polypropyleneoxide polyol intermediate is a homopolymer or a copolymer, wherein said copolymer is made from propyleneoxide monomers and from about 0 percent to about 60 percent by weight of an ethyleneoxide comonomer, a butyleneoxide comonomer or a pentaleneoxide comonomer, said percentage of said comonomer based upon the total weight of said propyleneoxide monomer and said comonomer; wherein a polyisocyanate is reacted with said blend of said polyol intermediates to form said prepolymer, wherein said polyisocyanate has the formula $R(NCO)_n$ wherein n is 2, 3, or 4, and wherein R is an aliphatic, an aromatic, or an aliphatic substituted aromatic having from 4 to 20 carbon atoms.

13. A polyurethane sealant composition according to claim 12, wherein the molecular weight of said polypropyleneoxide polyol intermediate is from about 1,000 to about 10,000, wherein the amount of said polypropyleneoxide polyol intermediate is from about 75 percent to about 93 percent by weight, wherein the molecular weight of said polybutyleneoxide homopolymer or copolymer is from about 8,000 to about 30,000, and wherein the amount of said polybutyleneoxide polyol intermediate is from about 7 percent to about 25 percent by weight, said percentages based upon the total weight of said polypropyleneoxide polyol and said polybutyleneoxide polyol.

14. A polyurethane sealant composition according to claim 13, wherein said polypropyleneoxide polyol intermediate has an average functionality of from about 1.9 to about 3.0, wherein said polybutyleneoxide polyol intermediate has an average functionality of from about 1.9 to about 3.0, wherein R of said polyisocyanate is an alkyl, an aromatic, or an alkyl substituted aromatic having from 6 to 15 carbon atoms, and wherein the equivalent weight ratio of said polyisocyanate to said blend of said polyol intermediates is from about 1.8 to about 2.2.

15. A polyurethane sealant composition according to claim 14, wherein said polybutyleneoxide polyol comonomer is ethyleneoxide, wherein said polypropyleneoxide polyol comonomer is ethyleneoxide, wherein the amount of said ethyleneoxide comonomer forming said polypropyleneoxide polyol copolymer is from about 2 to about 8 percent by weight based upon the total weight of said ethyleneoxide comonomer and said propyleneoxide monomer, wherein said end capping agent is an epoxy end capping agent, wherein the equivalent weight ratio of said epoxy end capping agent to said isocyanate terminated end groups is from about 0.8 to about 1.1, and wherein said n of said polyisocyanate is 2.

16. A polyurethane sealant composition according to claim 15, wherein the molecular weight of said polypropyleneoxide polyol is from about 4,000 to about 7,000, wherein the molecular weight of said polybutyleneoxide polyol copolymer is from about 12,000 to about 20,000, wherein the amount of said polypropyleneoxide polyol is from about 80 percent by weight to about 90 percent by weight, wherein the amount of said polybutyleneoxide copolymer polyol is from about 10 percent to about 20 percent by weight, said weight percents based upon the total amount by weight of said polypropyleneoxide polyol and said polybutyleneoxide copolymer polyol, and wherein said polyisocyanate is MDI, TDI, or combinations thereof.

17. A polyurethane sealant composition according to claim 11, wherein said sealant composition is cured, wherein said curing agent is said polyimine or said separate polyamine curing agent wherein said polyamine is (1) an amine having the formula

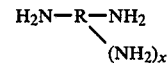

wherein R is an aliphatic or an aliphatic substituted aromatic having from 1 to 25 carbon atoms with the proviso that said aliphatic group is connected to said amine group, wherein x is 0 or 1, (2) an amine terminated polyether, or (3) a polyamide polyamine made from a polyamine and a dicarboxylic acid having from 2 to 36 carbon atoms, a dimerized fatty acid, or a trimerized fatty acid, and wherein said polyimine is a compound produced by the reaction of an aldehyde or a ketone with said (1) amine compound, said (2) amine terminated polyether, or said (3) polyamide polyamine of said dicarboxylic acid, said dimerized fatty acid or said trimerized fatty acid.

18. A polyurethane sealant composition according to claim 14, wherein said sealant composition is cured, wherein said separate polyamine curing agent is (1) an amine having the formula

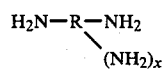

wherein R is an aliphatic or an aliphatic substituted aromatic having from 1 to 25 carbon atoms with the proviso that said aliphatic group is connected to said amine group, wherein x is 0 or 1, (2) an amine terminated polyether, having a molecular weight of from about 200 to about 7,000, or (3) a polyamide polyamine made from a polyamine and a dicarboxylic acid having from 2 to 36 carbon atoms, a dimerized fatty acid, or a trimerized fatty acid, and wherein said polyimine is a compound produced by the reaction of an aldehyde or a ketone with said (1) amine compound, said (2) amine terminated polyether, or said (3) polyamide polyamine of said dicarboxylic acid, said dimerized fatty acid or said trimerized fatty acid.

19. A polyurethane sealant composition according to claim 12, wherein said sealant composition is cured, wherein said curing agent is an amine terminated polyether having the formula

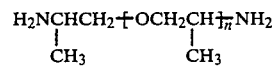

wherein n is from 4 to 20.

20. A polyurethane sealant composition according to claim 16, wherein said sealant composition is cured, wherein said curing agent is an amine terminated polyether having the formula

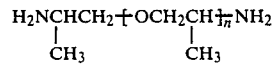

wherein n is from 4 to 20.

* * * * *